Figure 7:
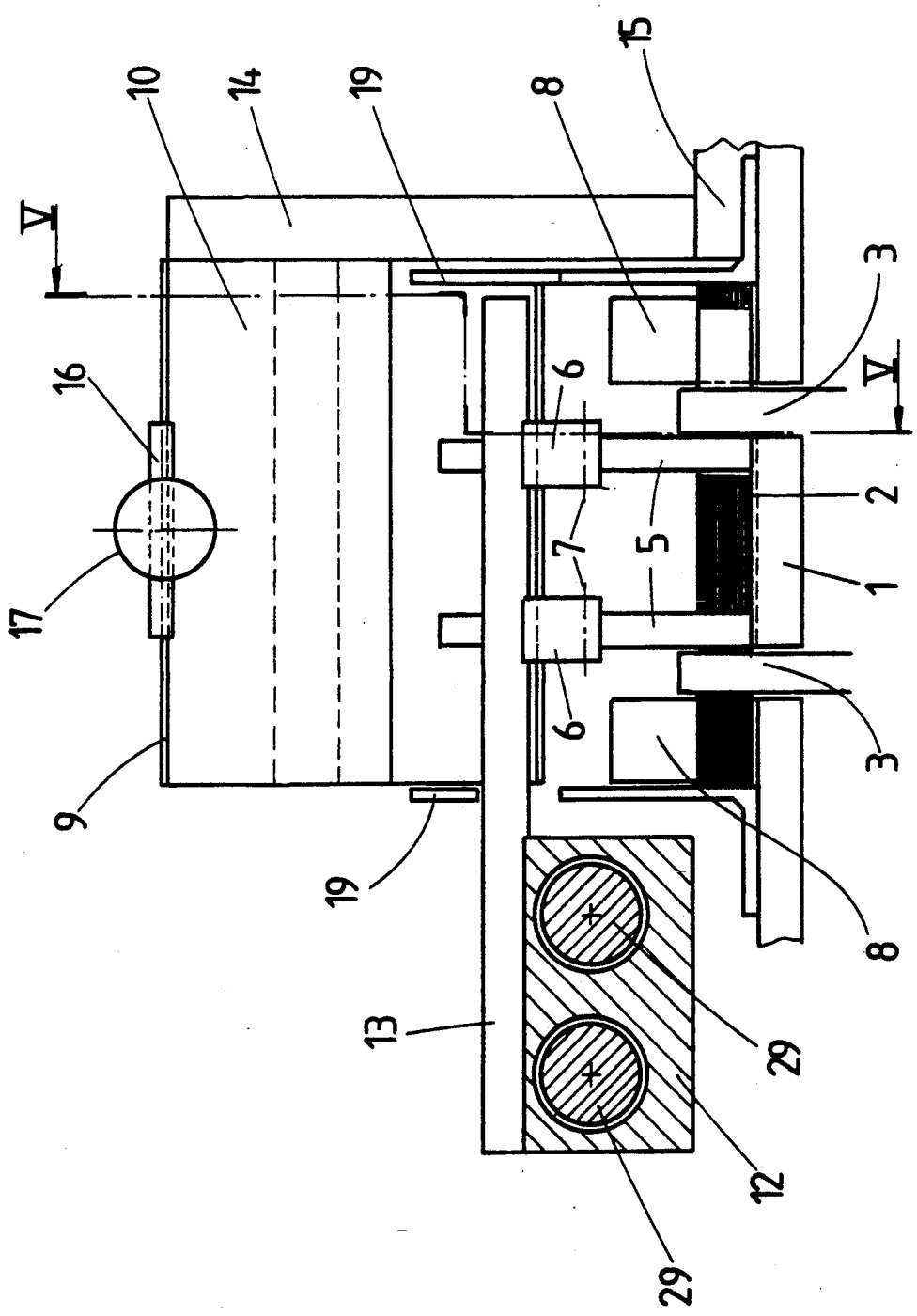

United States Patent [19]
Sauer

[11] Patent Number: 5,143,197
[45] Date of Patent: Sep. 1, 1992

[54] DEVICE FOR TURNING FLAT OBJECTS, SUCH AS FOR EXAMPLE BUNDLES OF NOTES

[75] Inventor: Hartmut K. Sauer, Himmelstadt, Fed. Rep. of Germany

[73] Assignee: De La Rue Giori, S.A., Lausanne, Switzerland

[21] Appl. No.: 822,034

[22] Filed: Jan. 15, 1992

[30] Foreign Application Priority Data

Feb. 28, 1991 [CH] Switzerland ............... 00611/91

[51] Int. Cl.$^5$ .................................... B65G 47/248
[52] U.S. Cl. ............................... 198/409; 198/410; 198/413; 198/403; 271/186
[58] Field of Search ............... 198/402, 403, 404, 409, 198/410, 411, 412, 413; 271/186

[56] References Cited

U.S. PATENT DOCUMENTS

| | | | |
|---|---|---|---|
| 742,314 | 10/1903 | Hampton et al. | 198/410 X |
| 1,327,315 | 1/1920 | Davies | 198/413 X |
| 3,323,632 | 6/1967 | Modder et al. | 198/413 |
| 3,360,103 | 12/1967 | Johnson | 198/402 |
| 3,567,008 | 3/1971 | Fischer | 198/402 |
| 3,759,401 | 9/1973 | Krevz et al. | 198/412 X |
| 4,019,435 | 4/1977 | Davis | 271/186 X |
| 4,175,655 | 11/1979 | Baldwin | 198/403 |

FOREIGN PATENT DOCUMENTS

| | | | |
|---|---|---|---|
| 1555313 | 1/1969 | France | 198/413 |
| 1461717 | 2/1989 | U.S.S.R. | 198/410 |
| 2098953 | 12/1982 | United Kingdom | 198/413 |

Primary Examiner—Robert P. Olszewski
Assistant Examiner—James R. Bidwell
Attorney, Agent, or Firm—Kane, Dalsimer, Sullivan, Kurucz, Levy, Eisele and Richard

[57] ABSTRACT

A thrusting mechanism with a thrusting member (5) which is moved periodically with an acceleration relative to the conveying speed out of a starting position into an end position and back into the starting position by a drive arrangement is provided on the conveying track (1) along a turning zone. Installed downstream of the starting position are an upward-curved ramp (8) and, at a distance downstream of the latter, a further upward-curved guide track (9) for the objects (2a, 2b, 2c) arriving on the conveying track (1) and moved by pushers (3). The whole arrangement is such that an object can be taken over in the turning zone by the thrusting member (5) and pushed upwards with an acceleration on the ramp (8) and the guide track (9) until it tilts backwards beyond its upright position and, after the return motion of the thrusting member (5) out of its end position, falls back turned onto the conveying track (1).

7 Claims, 6 Drawing Sheets

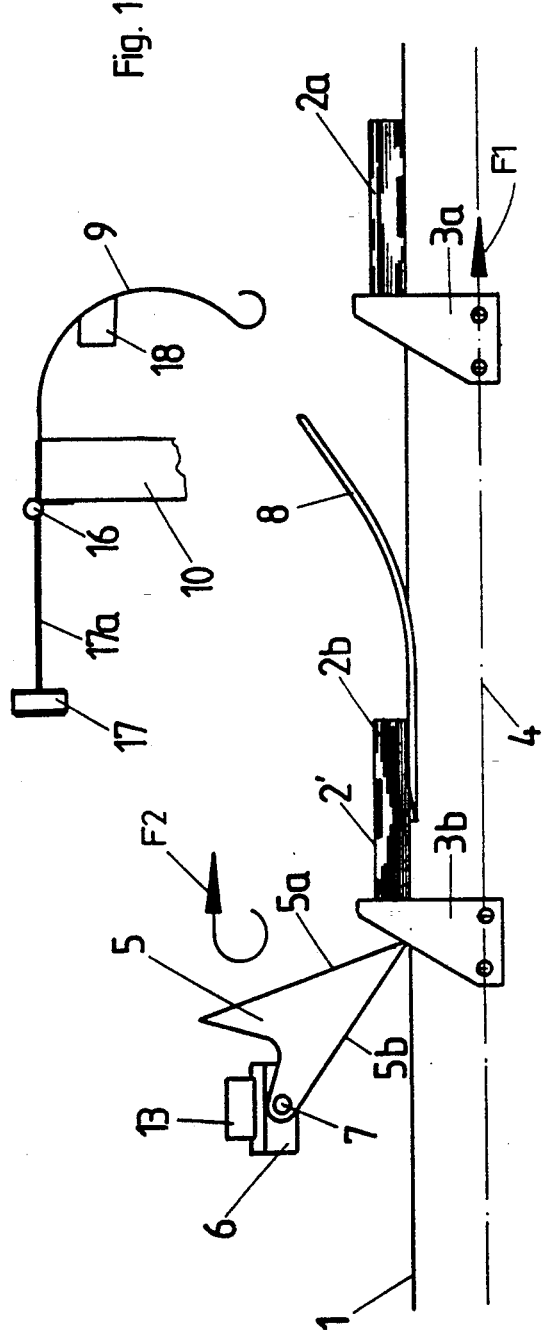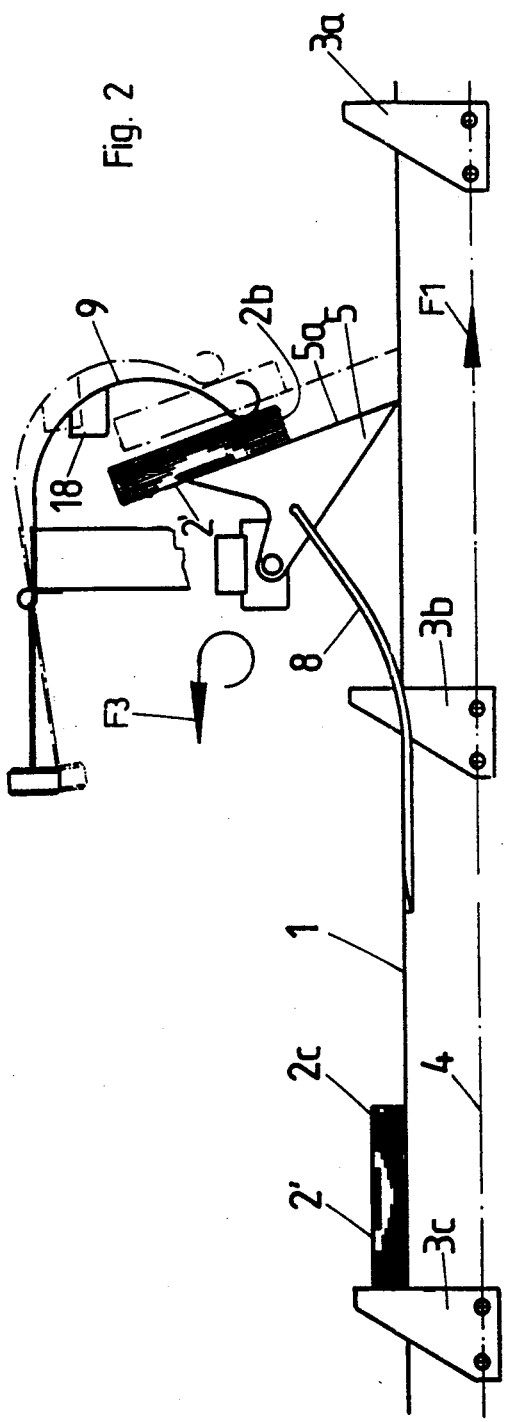

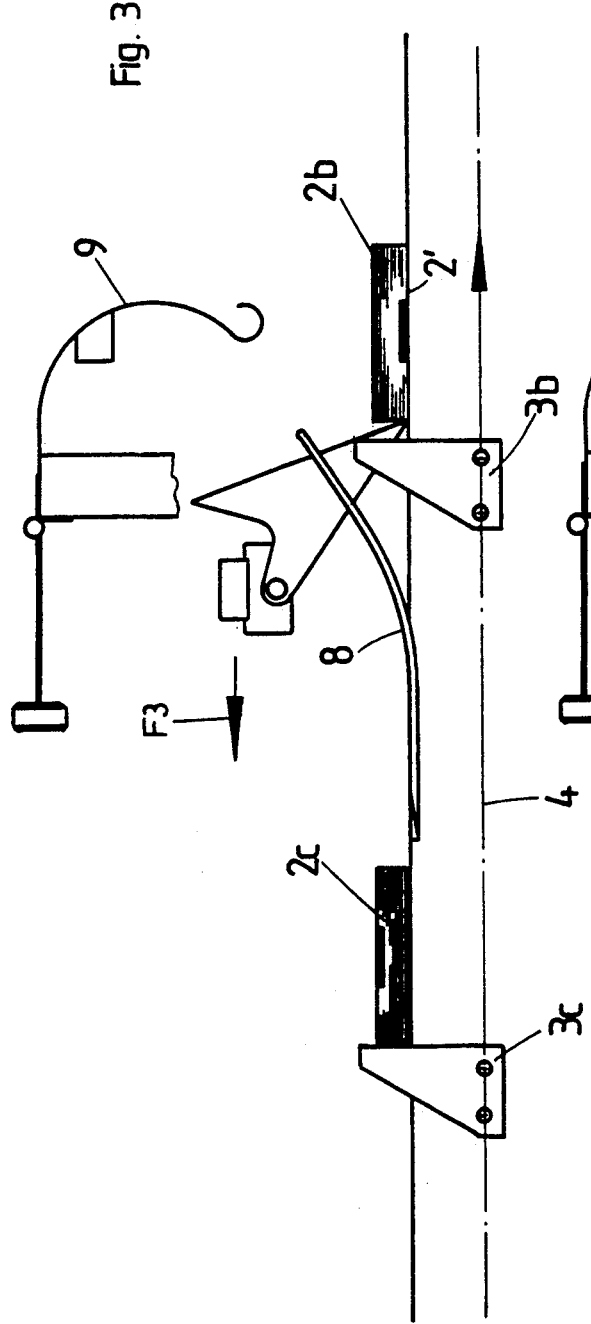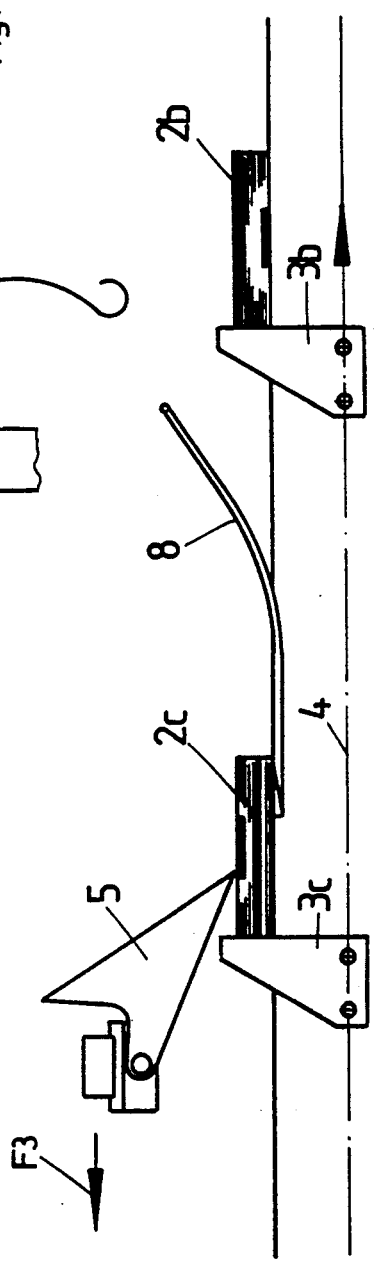

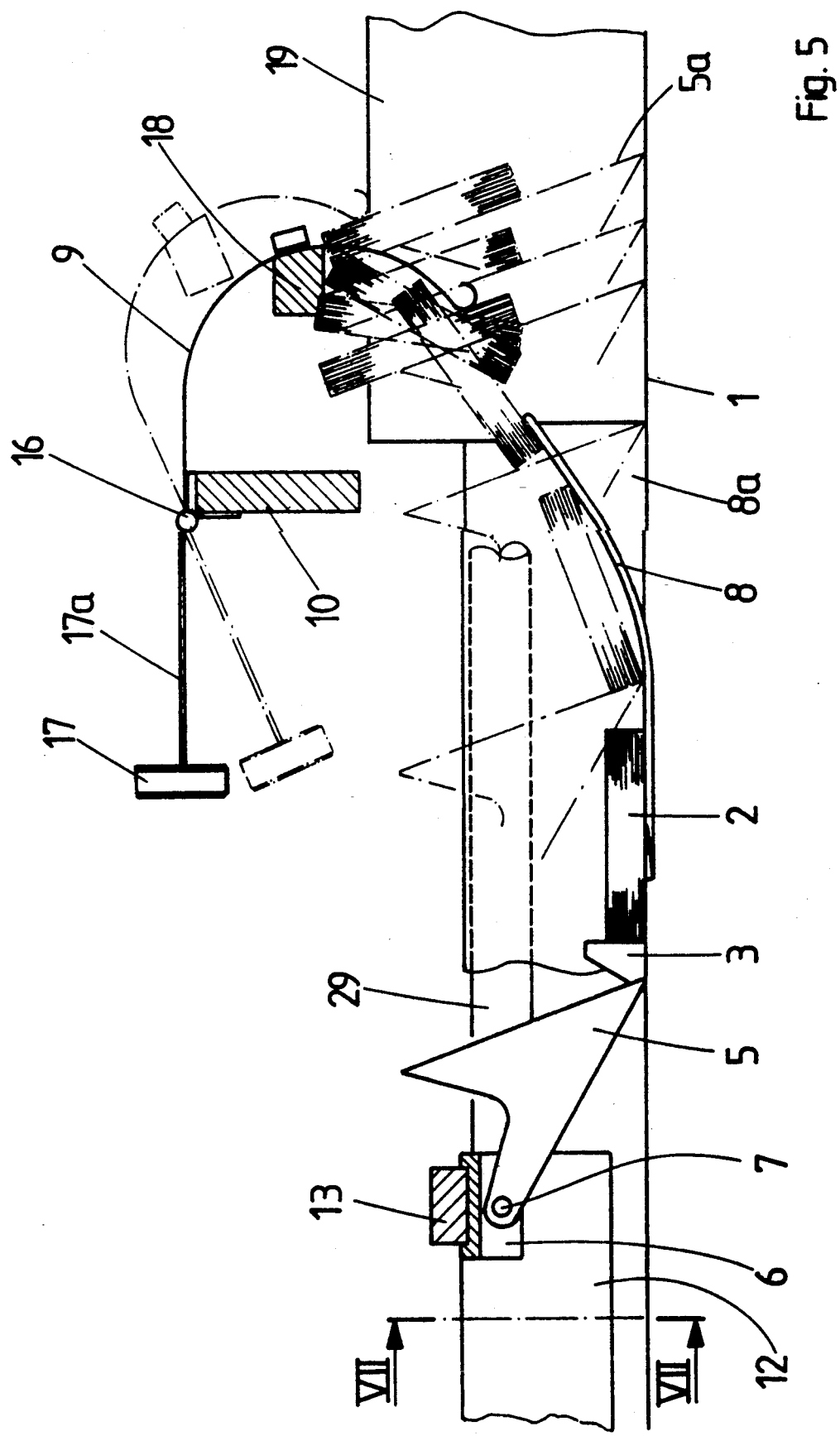

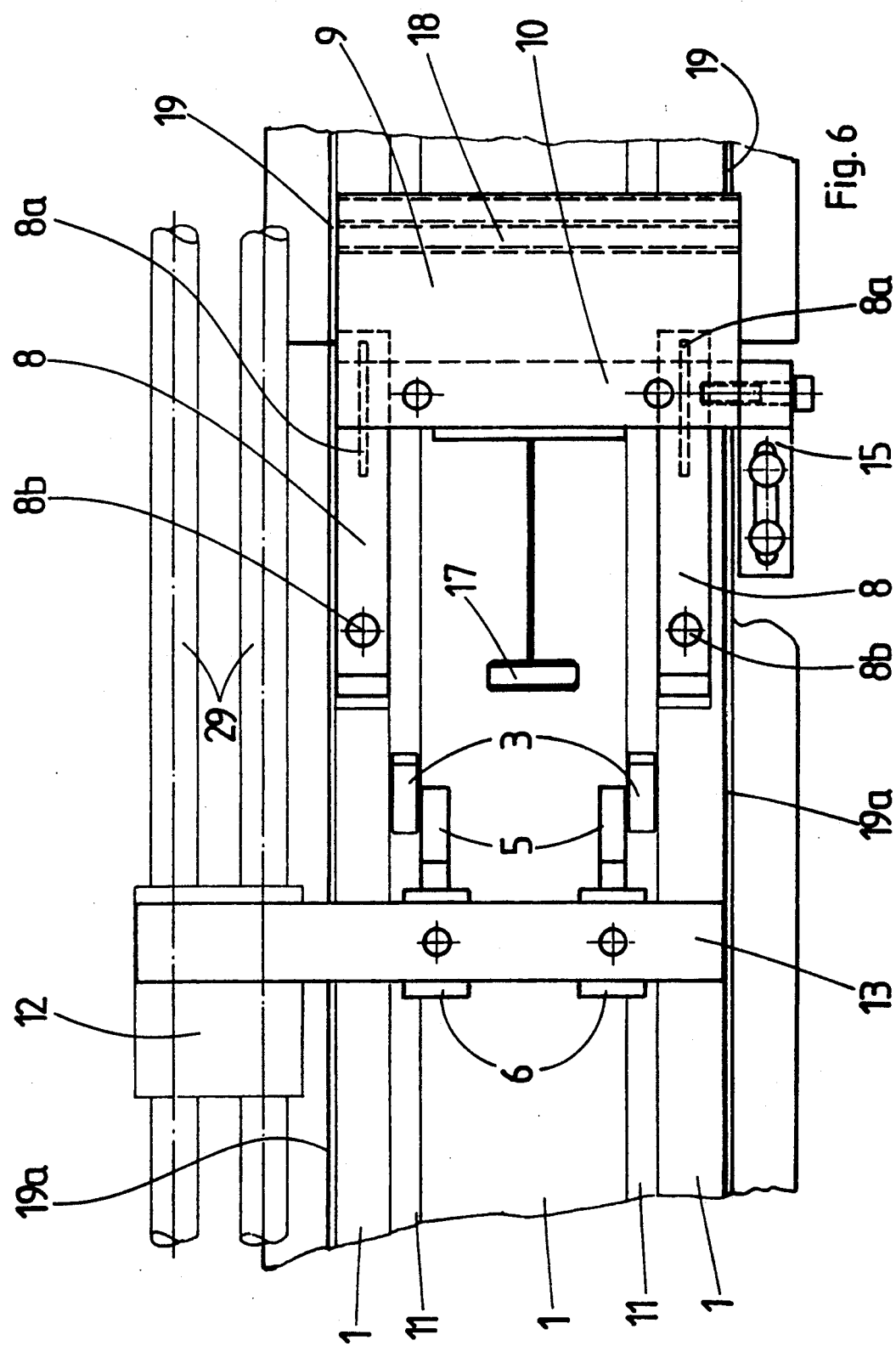

DEVICE FOR TURNING FLAT OBJECTS, SUCH AS FOR EXAMPLE BUNDLES OF NOTES

The invention relates to a device for turning flat objects, such as for example bundles of notes, which are transported in uniform fashion as material to be conveyed on a conveying track with the aid of pushers.

Sometimes, it is necessary to turn the material to be conveyed transported on a conveying track between two processing stations in such a way that the original upper side of the transported objects becomes the lower side in order, for example, to reverse the orientation of the object or of the individual items forming the object, the notes in the case of bundles of notes, or in order to change the imprint-bearing side of the bands or wrappers surrounding the objects relative to the conveying track.

In turning devices known hitherto, it is necessary in each case to transfer the material to be conveyed out of the conveying track, turn it and then transfer it back into the conveying track at the correct point.

The object on which the present invention is based is to avoid the complicated outward and inward transfer of the objects out of and into the conveying track and maintain the sequence of the conveying stream. At the same time, the invention is to simplify the construction of the turning device.

By means of the device according to the invention, it is ensured that each individual object transported on the conveying track undergoes in a certain respect an overriding thrust in the turning zone, in the process is raised by its front edge on the guide track and tilted beyond dead centre to such an extent that it then falls back onto the conveying track with the original upper side downwards If the conveying track continues on in a straight line, the turned object is taken over again by the original pusher, which in the intervening period has been moved on at the normal conveying speed. If the conveying device changes at the end of the turning zone, the turned objects are taken over one after the other in the correct conveying by the conveying members of the new conveying track.

Figure 8:
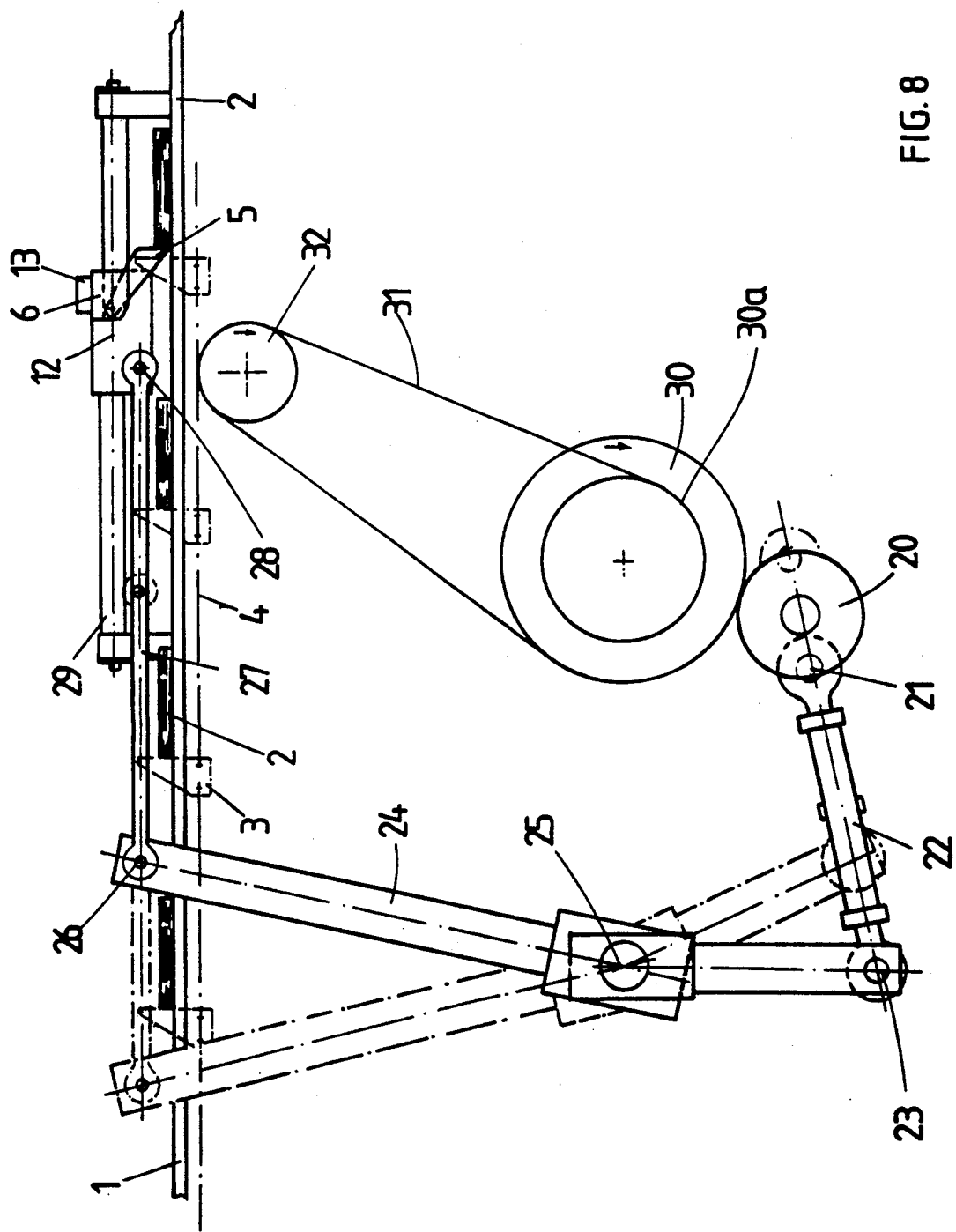

The invention is explained in greater detail by means of the drawings, with reference to an illustrative embodiment. In the drawings:

FIGS. 1 to 4 show schematic, highly simplified side views of a device according to the invention, four different phases of the turning operation being illustrated, FIG. 5 shows a somewhat more detailed side view of the turning device in section along the line V—V according to FIG. 7, FIG. 6 shows a schematic plan view of the device according to FIG. 5, FIG. 7 shows a section along the line VII—VII according to FIG. 5 and FIG. 8 shows a schematic representation of the drive arrangement for the periodically moved thrusting member.

According to FIGS. 1 to 4, objects, in the example under consideration band-wrapped bundles $2a$, $2b$, $2c$ of notes, are transported on a horizontal conveying track 1 with the aid of pushers $3a$, $3b$, $3c$, which move at a constant speed in the direction of the arrow F1 and push against the rear edge of the bundles of notes. Prior to turning, side 2' of the bundles of notes, which is marked by a thick line, faces upwards. The pushers $3a$, $3b$, $3c$ are attached to a chain 4 (indicated only in a schematic fashion), which is moved in uniform fashion and extends below the conveying track 1, and, with their upper ends, protrude beyond the plane of the conveying track through slots.

Within the turning zone depicted in FIGS. 1 to 4 is a thrusting mechanism which accelerates the bundle of notes and of which only the thrusting member 5 is depicted. This thrusting member 5 is a tilting lever which is mounted by means of a carrier 6 on a cross-beam 13 and mounted on the carrier 6 in such a way that it can be tilted about a pivot 7 lying transversely to the conveying direction. The cross-beam 13 is situated above the conveying track 1 and is moved parallel to the latter. The tilting lever 5 has approximately the shape of a triangle tapering downwards to a point, with a front face $5a$ which is inclined backwards in relation to the conveying direction F1 and with a rear face $5b$. The lower tip of the tilting lever 5 rests on the conveying track 1 and pushes on the latter.

With the aid of a drive arrangement, explained below, in the form of a crank mechanism, the cross-beam 13 with the tilting lever 5 periodically performs a reciprocating movement which, starting from the starting position shown in FIG. 1, proceeds forwards in the direction of the arrow F2 as far as an end position of the tilting lever 5, depicted in chain lines in FIG. 2, and from there back in the direction of the arrow F3 into the starting position. In this procedure, the outward movement of the tilting lever 5 in the direction of the arrow F2 and also the return movement of said tilting lever 5 into the starting position is accelerated in such a way in relation to the conveying speed of the pushers $3a$, $3b$, $3c$ that the period for a full motion cycle of the tilting lever 5 is equal to the quotient of the distance between two successive pushers $3a$, $3b$, i.e. successive objects $2a$, $2b$, and the conveying speed. This means that between the two instants at which the tilting lever 5 occupies two successive starting positions according to FIG. 1, a pusher or bundle of notes has travelled a distance precisely corresponding to the distance between two successive pushers. The movement of the tilting lever 5 is synchronised with the conveying movement of the pushers $3a$, $3b$, $3c$ in such a way that, in the starting position of the tilting lever 5, one pusher, in the example under consideration pusher $3b$, is immediately in front of the lower tip of this tilting lever 5, which is accelerated out of this position in the forward direction F2.

Provided for the turning operation are an upward-curved ramp 8 resting tangentially against the conveying track 1 and, in prolongation of the track of motion defined by this ramp 8, at a distance from the upper end of the ramp 8, a guide track 9, which is curved further upwards and, for example, comprises a correspondingly curved sheet. This guide track 9 rests by its upper, approximately horizontally oriented end on a transverse beam 10 and is swivellably mounted there on a horizontal pivot 16 aligned transversely to the conveying direction. The upper, horizontal end of the guide track 9 is extended by an arm $17a$, which carries a counterbalance weight 17 which is dimensioned such that the guide track 9 can be tilted easily in the anticlockwise direction about the pivot 16 out of its rest position shown in FIG. 1. A stop 18, which is situated somewhat above the point at which the guide track is vertically oriented, is also secured on the guide track 9.

The turning operation proceeds as follows: when, after passing through its starting position (FIG. 1), the tilting lever 5 is accelerated, it takes over the bundle $2b$ of notes hitherto moved by the pusher 3b, and the bundle of notes is now pushed with an acceleration up the ramp 8 and, after bridging the distance between the ramp 8 and guide track 9, onto the guide track 9 until the front edge of the bundle of notes strikes against the stop 18. During this process, the bundle of notes pushes against the guide track 9 under the continuous thrusting action of the tilting lever 5, the guide track thereby being swivelled upwards anticlockwise about the pivot 16, this being facilitated by the counterbalance weight 17. As the tilting lever 5 advances further, the bundle 2b of notes is moved into an upright position and tilted beyond the upright position rotated by 90° until its original upper side 2' comes to rest on the front face 5a of the tilting lever 5. At this point in time, the tilting lever 5 occupies its end position and the guide track 9 its upward-swivelled position, as illustrated in chain lines in FIG. 2. The purpose of the stop 18 is to hold the bundle of notes parallel to the turning axis during the turning operation. The easy swivelling of the guide track 9 achieved by means of the counterbalance weight 17 prevents any possibility of the bundle of notes becoming jammed.

When the tilting lever 5 reaches its end position in accordance with FIG. 2, it is, owing to its accelerated forward motion, situated at a certain distance in front of the pusher 3b which originally conveyed the bundle 2b of notes. Having reached its end position, the tilting lever 5 starts its accelerated return motion in the direction of the arrow F3. In FIG. 2, the solid lines indicate that position of the tilting lever 5 in which the guide track 9, relieved of the bundle 2b of notes, has reassumed its rest position, in which the arm 17a is oriented horizontally.

During the further return motion of the tilting lever 5, the bundle 2b of notes pushes down the front face 5a of said lever until, with the original upper side 2' facing downwards, it again rests flat on the conveying track 1 (FIG. 3). There it is taken over again by the original pusher 3b for onward conveyance (FIG. 4), while the tilting lever 5 returns to its starting position and, by virtue of its hinged mounting, slides over the subsequent bundle 2c of notes and the relevant pusher 3c in the process. As soon as the tilting lever 5 has reached its starting position again, it is situated immediately behind the following pusher 3c and the turning operation described above is repeated for the bundle 2c of notes. In this way, the conveying sequence of the bundles of notes is maintained after turning.

The distance between the ramp 8 and the guide track 9, the shape of which and the position of the end position of the tilting lever 5 and the shape of the latter are chosen such that the bundle of notes performs the turning procedure described and illustrated by means of FIGS. 1 to 4. The swivellability of the guide track 9 makes it possible to choose the interspace between the ramp 8 and the guide track 9 such that, in the rest position of the guide track, it is smaller than half the length of a bundle of notes but, in the swivelled position of the guide track 9, is large enough to allow a bundle of notes to tilt over without hindrance by the ramp 8 and, having been turned, to fall onto the conveying track. It is thereby ensured that each arriving bundle of notes reaches the guide track 9 even in the case of a very slow conveying speed, without falling off the ramp 8. It is thus impossible for a bundle of notes pushed forwards over the ramp 8 to drop down even when the conveying device is at a standstill, allowing the conveying operation to be continued again at any time without disruption.

In principle, it is also possible to provide a fixed guide track 9 without the ability to swivel if the device is intended for operation at a sufficiently high conveying speed; it is then possible to make the distance between ramp 8 and guide track 9 larger than half the length of a bundle of notes, such that the momentum of the accelerated bundle of notes is sufficient to push it across the distance mentioned onto the guide track 9, from where, as described, it then falls back turned onto the conveying track without being hindered by the ramp 8. It may also be possible to dispense with the stop 18.

FIGS. 5 to 7 show in somewhat more detail the essential components of the turning device indicated in FIGS. 1 to 4. According to said figures, the pushers 3 which move the bundles of notes and are secured on endless chains extending below the conveying track 1, project through slots 11 which are provided between the plates forming the conveying track 1. In the example under consideration, each bundle of notes is moved by two parallel pushers 3 which are secured on two synchronously revolving chains. The thrusting member comprises two parallel tilting levers 5 which are swivellable about the pivots 7 and the carriers 6 of which are secured on the cross-beam 13 and move inside the two pushers 3, which in each case form a pair. At one side, the cross-beam 13 is rigidly connected to a sliding block 12 which has two parallel guide bushes. Mounted laterally outside the conveying track 1 are two parallel, fixed guide rails 29, on which the sliding block 12 with its guide bushes is mounted in longitudinally displaceable fashion in ball-bearing guideways. The drive of the cross-beam 13 with the tilting levers 5 is described below with reference to FIG. 8.

As FIGS. 5 and 6 show, the ramp 8 comprises two upward-bent plates which rest on supports 8a, extend outside the pushers 3 along the two edges of the conveying track 1 and the initial zones of which rest tangentially against the conveying track 1 and are there secured by, for example, countersunk screws 8b. The bent guide track 9 provided with the arm 17a and the counterbalance weight 17 rests on the transverse beam 10 and can be tilted about the pivot 16. The transverse beam 10 is secured at one end on a lateral column 14 which is mounted on a baseplate 15 (FIGS. 6 and 7) which can be adjusted parallel to the conveying direction, allowing the exact position of the guide track 9 relative to the ramp 8 to be adjusted.

Lateral guide walls 19 for the bundles of notes are provided on both sides of the guide track 9. Guide walls 19a (FIG. 6) can likewise be arranged upstream of said guide track, along the conveying track 1.

The turning of a bundle 2 of notes is depicted again schematically in FIG. 5 by a plurality of successive positions of said bundle, the positions illustrating how the bundle 2 of notes is pushed over the ramp 8 onto the guide track 9 until it strikes against the stop 18, in the process swivelling the guide track 9 into the position indicated in chain lines, then tilts over and falls onto the front face 5a of the tilting lever 5 situated in its end position. During the subsequent return motion of the tilting lever 5, the now turned bundle 2 of notes moves back onto the conveying track 1.

FIG. 8 illustrates schematically the crank mechanism driving the thrusting member 5, i.e. the tilting lever. This crank mechanism has a crank wheel 20, a connecting rod 22 articulated on the periphery of the latter by means of a pivot 21, and a two-armed lever 24 which is articulated on the end of said connecting rod by means of a pivot 23, can be tilted about a fixed pivot 25 and extends to the side of the conveying track 1 and beyond the latter. Articulated on the upper end of this lever 24 by means of a pivot 26 is an arm 27 which extends essentially parallel to the conveying track 1. The sliding block 12 of the cross-beam 13 is mounted in articulated fashion on the other end of this arm by means of a pivot 28. The sliding block 12, together with the cross-beam 13 and the tilting levers 5 arranged on the latter, can be displaced along the fixed guide rails 29 oriented parallel to the conveying track 1.

The arrangement is such that the tilting levers 5 perform one complete motion cycle during one full revolution of the crank wheel 20, i.e. the lever 24 is moved out of one end position, represented in chain lines in FIG. 8, which corresponds to the starting position of the tilting levers 5, into the position represented by solid lines, which corresponds to the end position of the tilting levers 5, and back again. The speed of the crank wheel 20, which is matched to the conveying speed of the pushers 3, amounts to one revolution per motion period of the tilting levers. In the example under consideration, the maximum stroke of the upper end of the lever 24 and hence of the tilting levers 5, said maximum stroke being performed in one half revolution of the crank wheel 20, is chosen so that it is approximately equal to the distance between two successive pushers 3.

The specified speed can be achieved, for example, by the crank wheel 20, which is designed as a gear, being driven by a gear 30 which is twice as large and the number of teeth of which is thus twice as great as that of the crank wheel 20, and by this gear 30, for its part, being rotated by the chain 4 moving the pushers 3 in such a way that it performs one full revolution when the chain 4 has moved by a distance corresponding to twice the distance between adjacent pushers 3. Provided for this purpose according to FIG. 8 is a chain wheel 32, which is moved by the chain 4 and drives the gear 30 by means of a chain 31 which extends over a toothed rim 30a of the gear 30. In the case where the chains 4 and 31 have the same chain pitch, the number of teeth of the toothed rim 30a is equal to twice the number of links which the chain 4 has between adjacent pushers.

The arrangement can also be such that the chain 4 with the pushers 3 ends before the end position of the tilting levers 5 and at this point the turned bundles of notes falling from the guide track 9 onto the conveying track 1 are successively taken over in the correct sequence by the pushers of a further conveying track extending perpendicular to conveying track 1. In this case, the chain 4 can run directly over the chain wheel 32 and the toothed rim 30a of the gear 30, and chain 31 is dispensed with.

The device according to the invention is not restricted to the illustrative embodiment shown but allows of numerous variants, particularly as regards the configuration of the curved guide track 9 and of the drive mechanism for the thrusting member 5.

I claim:

1. Device for turning flat objects (2a, 2b, 2c), such as for example bundles of notes, which are transported in uniform fashion as material to be conveyed on a conveying track (1) with the aid of pushers (3a, 3b, 3c), characterised in that a thrusting mechanism which accelerates the objects and has a thrusting member (5) moved at least approximately parallel to the conveying track is provided along a turning zone, which member has a front face (5a), inclined backwards in relation to the conveying direction and is moved periodically with an acceleration relative to the conveying speed out of a starting position into an end position and back into the starting position by a drive arrangement (20 to 27), the motion period of this thrusting member (5) being given by the quotient of the distance between successive objects on the conveying track and the conveying speed, and in that an upwardcurved ramp (8), the start of which lies tangentially to the conveying track (1), and, at a distance from the end of this ramp, in the track of motion defined by the latter, a guide track (9) curved further upwards and bent to an at least vertical orientation are arranged in the turning zone in such a way that each object, under acceleration by the thrusting member (5), is pushed up on the ramp (8) and the guide track (9), then tilted backwards through an angle of over 90° and, after the removal of the thrusting member (5) out of its end position, falls back onto the conveying track (1) having been turned.

2. Device according to claim 1, characterised in that the curved guide track (9) is mounted at its upper region in such a way that it can be tilted about a horizontal pivot (16).

3. Device according to claim 2, characterised in that the curved guide track (9) has a stop (18) for the front edge of the object pushed upwards.

4. Device according to claim 1, characterised in that the curved guide track (9) is curved approximately into the horizontal beyond the stop (18) and carries a counter balance weight (17) at its upper end.

5. Device according to one of claim 1, characterised in that lateral guide walls (19) are provided on both sides of the curved guide track (9).

6. Device according to one of claim 1, characterised in that the thrusting member (5) can be moved on a guide rail (29) oriented parallel to the conveying track (1) and comprises at least one tilting lever swivellable during the return movement.

7. Device according to claim 6, characterised in that the drive arrangement for the thrusting comprises a crank mechanism (20 to 27) which can be driven by an element moved synchronously with the conveying speed, in particular a chain (4) which moves the pushers.

* * * * *